Dec. 30, 1952     J. STIPEK     2,623,433
STEREOSCOPIC PROJECTION SYSTEM, INCLUDING
ANAGLYPHIC AND POLARIZING FILTERS
Filed Sept. 1, 1948
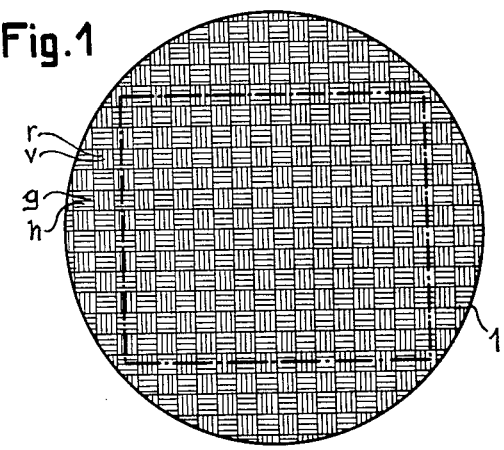
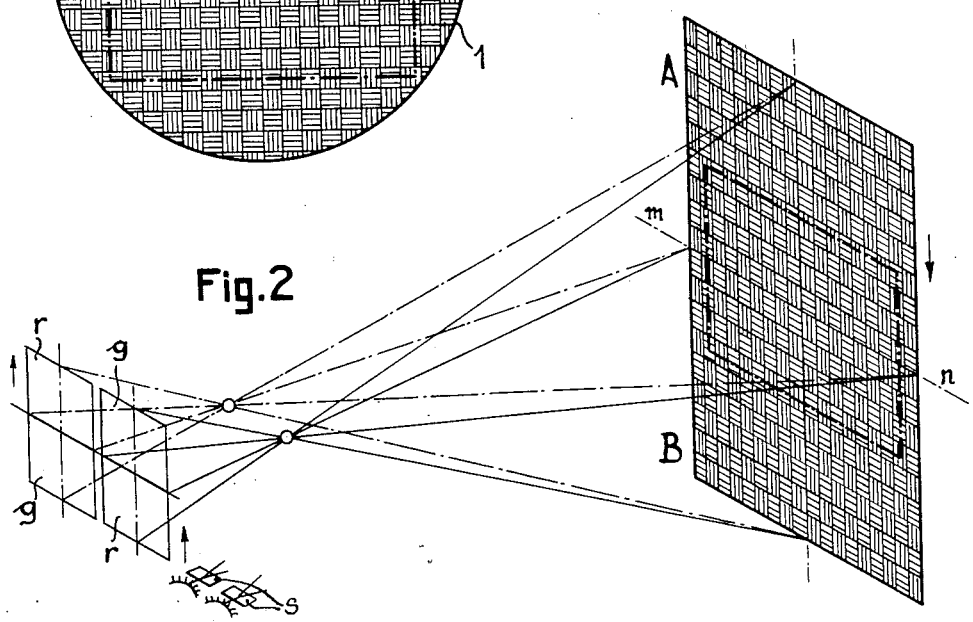
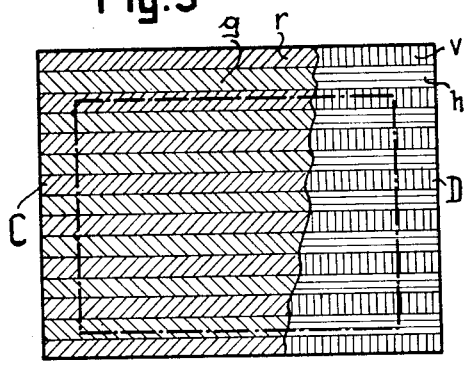
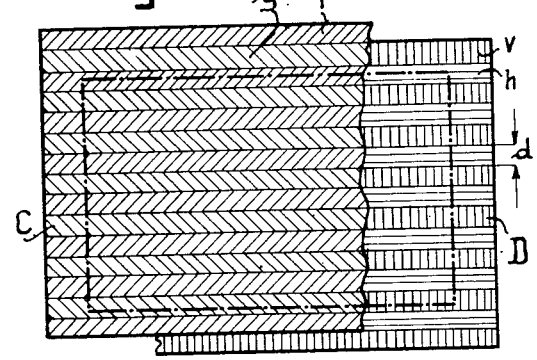
Inventor
Johann Stipek
By Robert E. Burns
Attorney Patented Dec. 30, 1952

2,623,433

UNITED STATES PATENT OFFICE 2,623,433

STEREOSCOPIC PROJECTION SYSTEM, INCLUDING ANAGLYPHIC AND POLARIZING FILTERS

Johann Stipek, Vienna, Austria

Application September 21, 1948, Serial No. 47,251
In Austria September 20, 1947

7 Claims. (Cl. 88—16.6)

This invention relates to stereoscopic photographs, especially to steroscopic motion pictures.

The object of the invention is to facilitate and improve the reproduction and viewing of steroscopic component images so as to produce a steroscopic effect.

To reproduce component images which are taken stereoscopically (left-eye and right-eye images), methods are known which produce the stereoscopic effect by projecting the two component images in two mutually complementary colors, preferably red and green, (anaglyphs); the eyes of the viewers of those anaglyphs are equipped with color filters whose colors correspond to the colors of the separate component images. That "anaglyph method" is known to be disadvantageous for prolonged viewing, and thus for viewing motion pictures, since a fatigue of the eye results in respect of the color which is co-ordinated with it, after a short period of time.

It has been proposed already to interchange in certain intervals the colors of projection as well as the color filters placed in front of the eyes of the viewer. For this purpose it is necessary either to mount on the spectacles a mechanical device, which would irritate the viewer, or to notify the viewers each time when the viewer spectacles are to be turned round.

While the abovementioned disadvantages of the "anaglyph method" are obviated when the two component images are projected with light polarized in different directions—the images being viewed with the known type of spectacles equipped with polarizing filters—it is known that the images projected in such a manner are of low luminosity, especially for acute angles of observation.

To obviate this drawback, it has been proposed to project the two component images with nonpolarized light and to polarize the light only on the surface of projection. For this purpose, the surface of projection is overlaid with a stationary or moving pattern formed by layers polarizing the light of projection in two different directions, or polarizing foils are inserted in front of the surface of projection. The component images are projected in a pattern corresponding to the pattern on the surface of projection. These methods render the projection dependent to a certain extent on the configuration and/or motion of the pattern of the polarizing filters with which the surface of projection is overlaid.

The present invention combines the advantages of those known methods while overcoming their drawbacks. According to the invention, the two steroscopic component images are projected in the known manner with differently colored light. These anaglyph component pictures are transformed on the surface of projection into component pictures of differently polarized light so that they can be viewed with spectacles equipped with colorless polarizing filters. The fatigue of the eye which would result from the prolonged viewing of component pictures of the same color (e. g., red for the right eye and green for the left one) is obviated according to the invention by rotating the screen in short intervals (suitably every shifting of scenes) through a right angle so that the green image is now co-ordinated with the right eye and the red image with the left one, until the next rotary movement of the screen brings about a new interchange of the colors.

It is to be noted that the directions of polarization co-ordinated with the respective component pictures on the screen are not changed when the screen is rotated. This result is achieved by the shifting of the colors co-ordinated with the respective eyes and is performed unobserved by the viewer.

The loss in light intensity resulting from the filtering of the light on the surface of projection is partially compensated by projecting not with polarized but only with color-filtered light. Since the polarization of the light is effected only on the surface of projection, the advantages connected with that method are retained, whereas the projection according to the invention eliminates the need for translating the component images by means of a pattern.

In the drawings,

Fig. 1 is an elevation of a screen according to the invention.

Fig. 2 is a perspective view illustrating a method of projection on a screen, in accordance with the invention.

Figs. 3 and 4 are elevations with parts broken away and showing two layers which can be displaced relative to each other.

The drawings show in Fig. 1 a screen 1 according to the invention, overlaid with a pattern of small color-filter elements which are alternately colored, e. g., in the complementary colors red and green and are designated in Fig. 1 by the letters $r$ and $g$, respectively.

Said filter elements are overlaid with polarizing filters, which alternately polarize horizontally or vertically. In Fig. 1 it is assumed that a vertically polarizing element $v$ is placed over each red filter element and a horizontally polarizing element $h$ over each green filter element. The relative positions of the color and polarizing filters may be reversed or the filters may be combined in one layer, the polarizing filter element $v$ and $h$ themselves carrying the red and green colors, respectively.

Where a transparent screen is used, the projection can also be effected from behind. In that case the polarizing filter layers are suitably arranged on the side facing the viewers.

When anaglyph images are projected onto such a screen, the red-colored projecting rays will pass only through the red-colored filter elements and through the vertically polarizing filters, the red-colored component image thus being visible only to that eye with which the vertically polarizing filter of the spectacles $s$, Fig. 2, is associated, whereas the green-colored component picture is visible only to the other eye, with which the horizontally polarizing filter of the spectacles is associated.

Fig. 2 illustrates a method of projection in which, instead of coloring the component images (left-eye and right-eye images) of the motion picture in the complementary colors red and green, respectively, two filters $h$—$g$ and $g$—$m$ (Fig. 2) are used, which are colored in mutually complementary colors, e. g., red and green, and are inserted in the separate paths of the projecting rays.

The screen is divided along its axis of symmetry $m$—$n$ into two fields A, B, and is moved in the direction of the arrow synchronously with the interchange of the filters $r$ and $g$ co-ordinated with the component images, in such a manner that the elementary surfaces of the screen become effective with a pattern turned through a right angle simultaneously as the colors of the projecting beams are interchanged by the shifting of the filters $r$ and $g$.

Figs. 3 and 4 show a screen comprising two layers which can be displaced relative to each other to a small extent. The transparent layer C in front is assumed to consist of color-filter elements $r$, $g$, alternately colored red and green, respectively. Said filters are of uniform width and are arranged in a checkered (as shown) or striped pattern.

The back layer is assumed to be a transparent or diffusely reflecting surface of projection D, which is overlaid with polarizing filter elements $v$, $h$, whose directions of polarization are vertical and horizontal, respectively. For instance, a vertically polarizing element $v$ may be arranged behind each red filter $r$ and a horizontally polarizing element $h$ behind each green filter $g$ of the front layer C.

When said two layers are displaced relative to each other by the width $d$ of a filter element, the directions of polarization co-ordinated with the colored elements $r$ and $g$, respectively, are interchanged. According to the invention, the colors of projection of the separate component images are interchanged at the same time.

What I claim is:

1. For reproducing and viewing stereoscopic component images (left-eye and right-eye images), the combination of means to project the two stereoscopic component images in anaglyph colors, a screen overlaid with small, mosaically arranged filter elements alternately colored in said two anaglyph colors and with polarizing filters of alternately vertical and horizontal directions of polarization, the filters polarizing in one of said two directions being associated with the color filters of one of said anaglyph colors, the filters polarizing in the other direction being associated with the filters of the other anaglyph color, and of viewer spectacles fitted with colorless polarizing filters.

2. For reproducing and viewing stereoscopic component images (left-eye and right eye images): the combination of means to project the two stereoscopic component images in anaglyph colors, a screen overlaid with small, mosaically arranged filter elements alternatively colored in the two anaglyph colors and with polarizing filters of alternately vertical and horizontal directions of polarization, the filters polarizing in one of said two directions being associated with the color filters of one of said anaglyph colors, the filters polarizing in the other direction being associated with the filters of the other anaglyph color, means to interchange in certain intervals the colors co-ordinated on the screen with said filter elements polarizing in either of said two directions, means to rotate synchronously with the shifting of the colors the directions of polarization of the polarizing filter elements through a right angle, and of viewer spectacles fitted with colorless polarizing filters.

3. For reproducing and viewing stereoscopic component images (left-eye and right-eye images): the combination of means to project the two stereoscopic component images in anaglyph colors, a screen overlaid with small, mosaically arranged filter elements alternately colored in said two anaglyph colors and with polarizing filters of alternately vertical and horizontal directions of polarization, the filters polarizing in one of said two directions being associated with the color filters of one of said anaglyph colors, the filters polarizing in the other direction being associated with the filters of the other anaglyph color, means to interchange in certain intervals the colors of projection which are co-ordinated on the screen with the filter elements polarizing in either of said two directions, and means to rotate synchronously with the shifting of said colors the surface of projection overlaid with said polarizing filter elements through a right angle, thus turning the directions of polarization of said filter elements through a right angle, and of viewer spectacles fitted with colorless polarizing filters.

4. For reproducing and viewing stereoscopic component images (left-eye and right-eye images), the combination of a screen overlaid with small, mosaically arranged filter elements alternately colored in said two anaglyph colors and with polarizing filters of alternately vertical and horizontal directions of polarization, the filters polarizing in one of said two directions being associated with the color filters on one of said anaglyph colors, the filters polarizing in the other direction being associated with the filters of the other anaglyph color, means to move said screen in certain intervals so as to turn the directions of polarization of the polarizing filter elements through a right angle, anaglyph color filters inserted in the paths of the beams projecting the component images and means to move said color filters synchronously with the changes of the directions of polarization, so that the filtered projecting beam corresponding to a given component image always falls on the surface of projection with which it is co-ordinated, and of viewer spectacles fitted with colorless polarizing filters.

5. For reproducing and viewing stereoscopic component images (left-eye and right-eye images), the combination of means to project the two stereoscopic component images in anaglyph colors, a screen comprising two layers displaceable relative to each other, one of said layers carrying small, mosaically arranged filter elements alternatively colored in said two anaglyph colors, the other layer carrying polarizing filters of alternately vertical and horizontal directions of polarization, said layers being so combined with each other that the filters polarizing in one of said two directions are associated with the color filters of one of said anaglyph colors, the filters polarizing in the other direction being associated with the filters of the other anaglyph color, means to turn the directions of polarization co-ordinated with the respective anaglyph colors through a right angle by moving in certain intervals said two layers relative to each other, and of viewer spectacles fitted with colorless polarizing filters.

6. For reproducing and viewing stereoscopic component images (left-eye and right-eye images), the combination of means to project the two stereoscopic component images in anaglyph colors on a transparent screen, comprising on opposite sides a layer of small, mosaically arranged filter elements alternately colored in two anaglyph colors and a layer of polarizing filter elements of alternately vertical and horizontal directions of polarization, said layers being so combined with each other that the filters polarizing in one of said two directions are associated with the color filters of one of said anaglyph colors, the filters polarizing in the other direction being associated with the filters of the other anaglyph color, and of viewer spectacles fitted with colorless polarizing filters.

7. For reproducing and viewing stereoscopic component images (left-eye and right-eye images), the combination of means to project the two stereoscopic component images in anaglyph colors, a screen comprising a layer of polarizing filter elements of alternately vertical and horizontal directions of polarization, the elementary crystals of the filter elements polarizing in one of said directions being colored in one of two anaglyph colors, the elementary crystals of the filter elements polarizing in the other direction being colored in the other anaglyph color, said layers being so combined with each other that the filters polarizing in one of said two directions are associated with the color filters of one of said anaglyph colors, the filters polarizing in the other direction being associated with the filters of the other anaglyph color, and of viewer spectacles fitted with colorless polarizing filters.

JOHANN STIPEK.

REFERENCES CITED

The following references are of record in the file of this patent:

UNITED STATES PATENTS

| Number | Name | Date |
| --- | --- | --- |
| 1,806,864 | Pallemaerts | May 26, 1931 |
| 2,053,689 | Barnes | Sept. 8, 1936 |
| 2,063,004 | Louisot | Dec. 1, 1936 |
| 2,132,904 | Martinez et al. | Oct. 11, 1938 |
| 2,210,806 | Etbauer | Aug. 6, 1940 |
| 2,218,875 | Parsell | Oct. 22, 1940 |
| 2,283,466 | Schensted | May 19, 1942 |
| 2,289,714 | Land | July 14, 1942 |
| 2,309,879 | Willis | Feb. 2, 1943 |

FOREIGN PATENTS

| Number | Country | Date |
| --- | --- | --- |
| 874,243 | France | Apr. 27, 1942 |